G. W. BACKUS.
DISHWASHER.
APPLICATION FILED NOV. 27, 1920.
1,414,928.
Patented May 2, 1922.
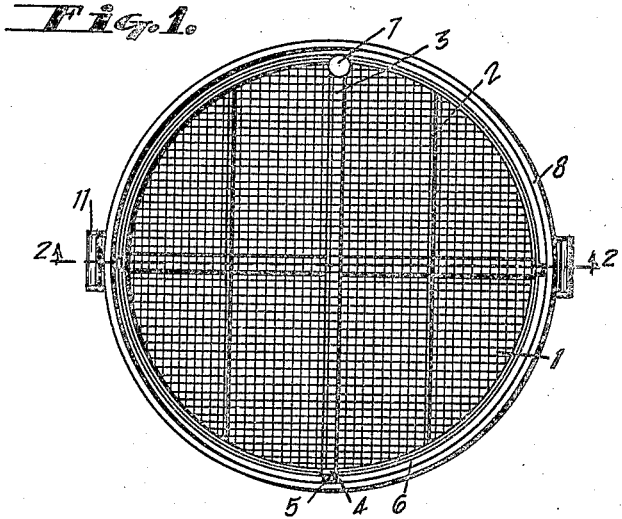
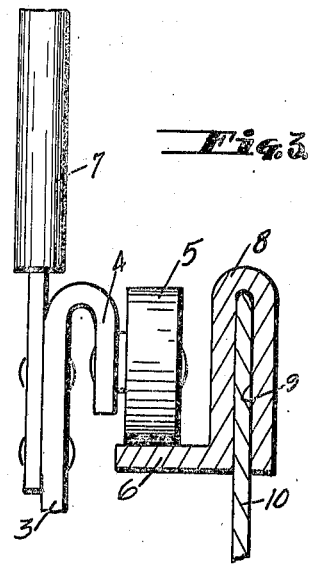
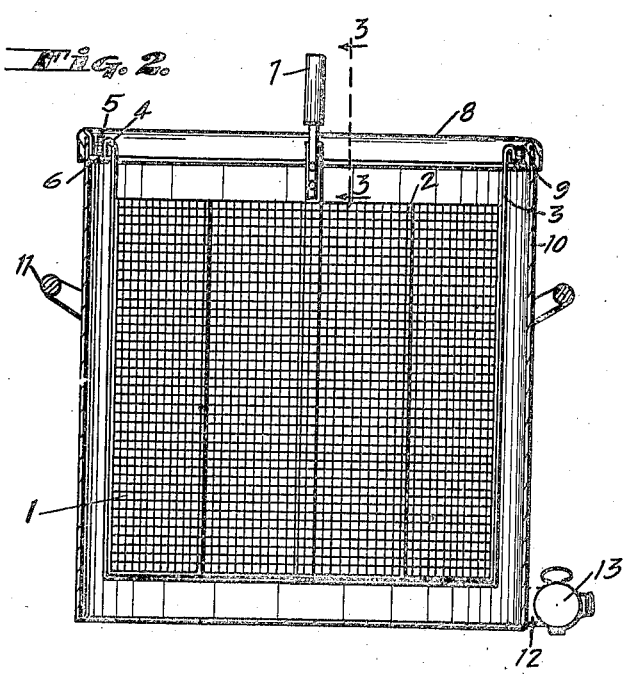
INVENTOR
George W. Backus.
By Hazard Miller
ATTYS

UNITED STATES PATENT OFFICE.

GEORGE W. BACKUS, OF LOS ANGELES, CALIFORNIA.

DISHWASHER.

1,414,928.　　　　　Specification of Letters Patent.　　Patented May 2, 1922.

Application filed November 27, 1920. Serial No. 426,835.

*To all whom it may concern:*

Be it known that I, GEORGE W. BACKUS, a citizen of the United States, residing at Los Angeles, in the county of Los Angeles and State of California, have invented new and useful Improvements in Dishwashers, of which the following is a specification.

This invention is a device for washing dishes and the like, and consists of a receptacle arranged for the ready passage of water through the same, and having means whereby it may be supported within a suitable tank and readily rotated therein.

The invention will be readily understood from the following description of the accompanying drawings, in which:

Figure 1 is a plan view of the washer.

Fig. 2 is a vertical section on the line 2—2 of Fig. 1.

Fig. 3 is a detail section showing the supporting connection between the inner receptacle and the tank in which it is suspended.

The receptacle in which the dishes or the like are placed is shown at 1 as formed of wire mesh, and is divided into compartments by transverse partitions 2, which are preferably of the same wire mesh. Reinforcing bands 3 are received against the outer surface of the wire receptacle so as to extend across the bottom of the receptacle and upwardly along the sides of the same. At their upper ends these bands extend above the upper edge of the inner receptacle, and preferably terminate in reversely bent ends 4 to which are journaled suitable rollers 5.

The rollers 5 are received upon a suitable trackway 6 formed as an annular trackway, so that the receptacle may be readily rotated with relation to the trackway. In order to thus rotate the receptacle, one of the bands 3 is provided with an upwardly projecting handle 7 adapted to be grasped for swinging the receptacle back and forth upon its trackway.

The trackway is detachably mounted upon the rim of a suitable tank, so that the receptacle will be suspended within the tank in spaced relation from the walls thereof. For this purpose the trackway is provided at its outer edge with a reversely bent annular rim 8 forming a vertical groove 9 received over the end of the wall 10 of the tank. The tank may be of any suitable construction, and is preferably provided with handles 11 and with a drain 12 at its base provided with a petcock 13.

With the parts assembled as thus described, the dishes are placed in the compartments of the inner receptacle, and the tank is filled with hot water. The inner receptacle is then oscillated in order to bring the water into intimate contact with the dishes, and the water is then withdrawn through drain 12. This operation may be repeated as many times as may be found necessary, and after the final draining off of the water, the dishes are allowed to remain in the receptacle in order to dry.

It will be noted that the construction as thus set forth, provides simple but efficient means for washing dishes and the like, and it will also be observed that the construction provides for the ready removal of the inner receptacle and trackway from the outer tank, so that the latter may be put to other uses.

Various changes may be made without departing from the spirit of the invention as claimed.

What is claimed is:

1. A washing device comprising a receptacle, and an annular track from which said receptacle is rotatably suspended, said track having a reversely bent rim forming an annular groove in which is adapted to be received the upper edge of a tank.

2. A washing device comprising a tank, a track having a reversely bent supporting portion sustained on the upper edge of the tank and a track portion extending inwardly from the tank, a receptacle within the tank, hangers secured to the receptacle and having reversely bent upper ends, and rollers rotatably sustained on the upper ends of the hangers and movable over the said track portion.

In testimony whereof I have signed my name to this specification.

GEO. W. BACKUS.